UNITED STATES PATENT OFFICE.

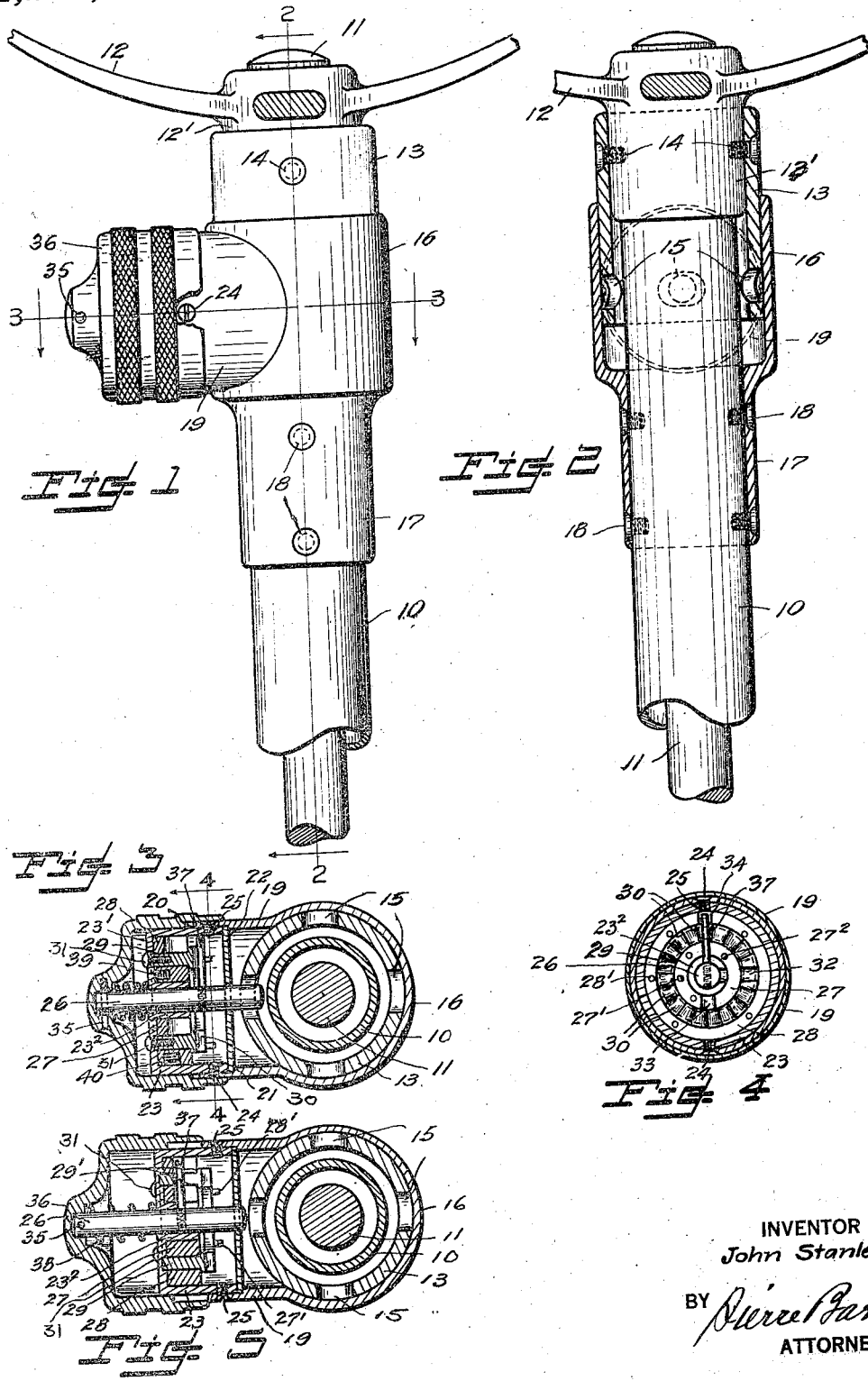

JOHN STANLEY, OF SEATTLE, WASHINGTON, ASSIGNOR TO JOHN STANLEY LOCK COMPANY, OF SEATTLE, WASHINGTON, A CORPORATION OF WASHINGTON.

AUTOMOBILE-LOCK.

1,295,810.

Specification of Letters Patent.

Patented Feb. 25, 1919.

Application filed April 25, 1918. Serial No. 230,769.

*To all whom it may concern:*

Be it known that I, JOHN STANLEY, a citizen of the United States, residing at Seattle, in the county of King and State of Washington, have invented certain new and useful Improvements in Automobile-Locks, of which the following is a specification.

This invention relates to improvements in the automobile-lock which is illustrated and described in United States Patent No. 1,257,039 granted to me February 19, 1918.

The principal object of my improvements is the provision of a novel construction of casing for housing a lock mechanism substantially as described in the above mentioned patent whereby the applications of the lock are extended to various forms of steering devices. A further object is to simplify and lessen the cost of manufacture and also render the lock capable of being applied to a steering post and column at a smaller cost. A still further object is to provide a device of this character wherein the combinations of the lock-mechanism may be readily adjusted by persons authorized to effect the same, but safe-guarded from being tampered with by others.

The invention consists in the novel construction, adaption and combination of devices to render the lock capable of attaining the above noted objects.

In the accompanying drawings,—

Figure 1 is a side elevation of my improved lock shown applied to an automobile steering column. Fig. 2 is a transverse sectional view of the device taken through 2—2 of Fig. 1. Fig. 3 is a sectional view through 3—3 of Fig. 1. Fig. 4 is a sectional view through 4—4 of Fig. 3. Fig. 5 is a view similar to Fig. 3 illustrating the lock in disengaged condition.

Referring to said drawings, the numeral 10 designates a tubular steering column through which extends a steering shaft 11 having secured to its upper end a steering wheel 12 as commonly arranged on automobiles.

According to the present invention a sleeve 13 is fixedly secured to the hub $12^1$ of the steering wheel as by means of screw threaded bolts 14. Said sleeve is of a length to extend below said wheel hub and adjacent to its lower end is provided in its periphery with one or more apertures 15, four being shown in Figs. 3 and 5. Said sleeve, furthermore, extends into the upper end 16 of a casing having its lower end 17 rigidly secured as by means of screw threaded bolts 18 to the steering column 10.

The screw bolts 14 and 18 are, in practice, formed with slotted heads, not shown, to accommodate a screw driver by which the bolts are inserted and, after the latter are engaged, said heads are sawed off or otherwise removed.

Formed integral with the casing part 16 and extending radially therefrom is a hollow boss 19 which is counterbored, as at 20, from its outer end to a shoulder 21. A centrally apertured disk 22 is held against said shoulder by a cylinder 23 which is secured in the counterbore of the boss 19 by means of slotted screws 24 extending through the peripheral wall of the boss to engage in threaded holes, such as 25, in the cylinder. Made integral with and extending inwardly from the outer end $23^1$ of said cylinder is a bushing $23^2$ which serves with the disk 22 as a guide for a locking bolt 26 disposed axially of the boss and adapted to engage in a selected one of the apertures 15 of the sleeve 13.

Rotatably mounted upon the bushing $23^2$ is an inner ring 27 from which extend two pins $27^1$ and $27^2$, the same being securely fastened in selected holes provided therefor in the inner face of the ring. An outer ring 28 is rotatably seated against the end of the cylinder and is provided with a pin $28^1$ extending from its inner face.

Interposed between said inner and outer rings is a crown piece 29 on the inner face of which is a plurality of serrations or teeth 30, Fig. 4. The crown piece is seated in an annular groove provided in the cylinder end $23^1$ and is rigidly secured to the latter by screws 31, as shown in Fig. 3.

The thickness of the crown piece 29 where it abuts the outer end of the cylinder is reduced to form shoulders, as $29^1$ which seat against said inner and outer rings to retain the same in operative positions against the outer end of the cylinder.

The crown piece 29, inner ring 27 and outer ring 28 are each provided with a slot, as respectively indicated in Fig. 4 by numerals 32, 33 and 34, and as the crown piece is stationary and the ring pin $28^1$ rotatable, it will be evident that the slots 33 and 34 may be brought to register one with the other and with the slots 32 in the crown piece to afford a continuous slot.

The outer end of bolt 26 is secured by means of a rivet or a screw 35 to a cap 36 which incloses the outer ends of the cylinder 23 and the boss 19 and is rotatable thereon.

Within said cylinder and extending radially from said arbor is a finger 37, in the nature of a rod having a screw threaded inner end engageable with, or disengageable from, a threaded hole in the locking bolt by means of a screw driver introduced through one of the cylinder holes, 25, when the latter are exposed by the cap being in its outermost position as shown in Fig. 5. The length of the bolt 26 is such that it may engage in an aperture 15 of the sleeve 13 when the cap 36 is in the position shown in Fig. 3.

38 represents a spring mounted on the bolt 26 between the cap 25 and the end of the cylinder, and which spring tends to yieldingly hold the cap in the position in which it is illustrated in Fig. 3.

39 and 40, Fig. 3 represent springs respectively positioned in recesses provided in said inner and outer rings and bearing against the cylinder for the purpose of yieldingly holding the same in set positions and also to obviate any looseness or rattling when the vehicle is in motion.

The manner in which my lock is used and operates may be described as follows:—

The device, as above explained, is fixedly secured to the steering wheel hub so that the locking bolt is positioned to engage in an aperture 15 of the sleeve 13 when the front wheels of the vehicle to which my invention is applied are inclined a certain amount to the right or left, as the case may be, the diameters of said aperture being such that the locking bolt will readily enter therein.

The device is in the unlocked position when the locking bolt 26 is clear of the sleeve 13, and the steering wheel is therefore free to move in either rotary direction, the cap 36 being then in its outermost position, as shown in Fig. 3, while the finger 37 occupies the slots in the rings and crown piece 29. On the car being brought to a standstill and it being desired to lock the front wheels, they are inclined to the right or left, as required, until the locking bolt 26 registers with one of the openings in the sleeve, whereupon the cap 36 may be pushed inwardly to engage the point of the locking bolt in the sleeve which is rigidly connected to the steering column 10.

This movement carries the finger 37 out of said slots, clear of the teeth of the crown piece 29 when, by giving the cap a turn to the right or left, the rings 27 and 28 will be moved to break the continuity of slots and the steering wheel will be locked, as the locking bolt cannot be withdrawn unless the combination necessary to effect the adjustments of the rings to present their slots into position to receive the finger 37 is known.

To unlock the steering wheel, the cap 36 is first turned clockwise until finger strikes a square face provided at one side of the slot 32 of the crown piece 29, this being the starting position for unlocking. The cap is then turned clockwise at the same time feeling the contact of finger 37 with the teeth of the crown piece and counting each tooth until the finger contacting with a pin $28^1$ carries ring 28 around until its slot 34 registers with the slot 32 of the crown piece. The cap 36 is then turned counter-clockwise until finger 33 contacting with the pin $27^2$ carries ring 27 around until its slot 33 registers with crown piece slot, whereupon a continuous slot will be formed, the finger 37 which will be carried thereinto by the spring 38 and simultaneously withdraw the locking pin from its engagement with the sleeve 13 to permit the turning of the steering wheel and the shaft 11.

It will be noticed that in order to effect the unlocking of the steering wheel it is necessary to know the combination that is, the number of teeth 30 over which the finger 37 must be passed first in one direction and then the other to obtain the continuity of the slots, and as this knowledge is confined to the operator of the car it is obvious that an unauthorized unlocking of the wheel is impossible.

Many different combinations may be obtained by setting the pins $27^1$, $27^2$ and $28^1$ in different positions in the rings 27 and 28, but which can only be done when the bolt 26 is disengaged from the sleeve and the cap 36 is in the retracted position in which it is shown in Fig. 5 to enable the screws 24 being withdrawn for the removal of the cylinder 23. After the cylinder is thus removed, the pins may be shifted into desired positions.

What I claim, is:—

1. In an automobile, the combination with a tubular steering column, a steering shaft extending therethrough, a steering wheel secured to the upper end of said steering shaft, and a peripherally apertured sleeve rigidly secured to the hub of said wheel, of a casing rigidly secured to said column and extending over the lower end of said sleeve, said casing being provided with a hollow boss counterbored to provide a shoulder, a locking bolt provided in said boss and engageable within an aperture of said sleeve to secure the wheel and shaft against rotation, an apertured guide disk for said locking bolt seated on said shoulder, locking mechanism including a cylinder detachably mounted within said boss and against said guide disk for controlling the action of said bolt, and manually actuated means for regulating said locking mechanism through the medium of said bolt to effect the engagement or disengagement of the latter with respect to said sleeve.

2. In an automobile, the combination with steering mechanism including a column, a steering-shaft, a steering-wheel, secured to said shaft, and an apertured sleeve secured to and extending below the hub of said wheel, of a casing rigidly secured to said column, said casing being provided with a chambered boss, a cylinder detachably connected within said boss by a screw extending through the peripheral wall of the latter, a locking bolt extending through said cylinder and engageable within an aperture of said sleeve for securing the sleeve and wheel against rotation, combination lock mechanism within the cylinder for controlling the axial movements of said bolt, means provided on the bolt and rendered operable by the rotation of the bolt for regulating said lock mechanism, and a cap secured to the end of said bolt whereby rotary and axial movements of the bolt are effected.

3. In an automobile, the combination with a steering mechanism including a column, a steering shaft, a steering-wheel secured to said shaft, and an apertured sleeve secured to and extending below the hub of said wheel, of a casing rigidly secured to said column, said casing being provided with a chambered boss, a cylinder detachably connected within said boss by a screw extending through the peripheral wall of the latter, a locking bolt extending through said cylinder and engageable within an aperture of said sleeve for securing the sleeve and wheel against rotation, lock mechanism within the cylinder for controlling the axial movements of said bolt, means provided on the bolt and rendered operable by the rotation of the bolt for regulating said lock mechanism, and a cap secured to an end of said bolt whereby rotary and axial movements of the bolt are effected, said cap being arranged to serve as a guard to prevent said screw being removed when the bolt is in engaged position with respect to said sleeve.

Signed at Seattle, this 17th day of April, 1918.

JOHN STANLEY.

Witnesses:
PIERRE BARNES,
HANNAH JONES.